(12) United States Patent
Bourvellec et al.

(10) Patent No.: US 11,285,653 B2
(45) Date of Patent: Mar. 29, 2022

(54) METHOD FOR POSITIONING HEAT-SCREENING RAMPS IN A PREFORM HEATING STATION

(71) Applicant: SIDEL PARTICIPATIONS, Octeville-sur-Mer (FR)

(72) Inventors: Loïc Bourvellec, Octeville-sur-Mer (FR); Stéphane Morin, Octeville-sur-Mer (FR)

(*) Notice: Subject to any disclaimer, the term of this patent is extended or adjusted under 35 U.S.C. 154(b) by 0 days.

(21) Appl. No.: 17/048,493

(22) PCT Filed: Apr. 4, 2019

(86) PCT No.: PCT/FR2019/050790
§ 371 (c)(1),
(2) Date: Oct. 16, 2020

(87) PCT Pub. No.: WO2019/202233
PCT Pub. Date: Oct. 24, 2019

(65) Prior Publication Data
US 2021/0162646 A1  Jun. 3, 2021

(30) Foreign Application Priority Data
Apr. 16, 2018 (FR) .................................. 1853285

(51) Int. Cl.
*B29C 49/42* (2006.01)
*B29C 49/68* (2006.01)
(Continued)

(52) U.S. Cl.
CPC .......... *B29C 49/06* (2013.01); *B29C 49/4205* (2013.01); *B29B 2911/1402* (2013.01); *B29C 49/6445* (2013.01); *B65G 2203/0208* (2013.01)

(58) Field of Classification Search
CPC .. B29C 49/4205; B29C 49/6409; B29C 49/68
See application file for complete search history.

(56) References Cited

U.S. PATENT DOCUMENTS

| 6,135,271 A | 10/2000 | Ledingham |
| 2007/0095247 A1 | 5/2007 | Ingraham |
(Continued)

FOREIGN PATENT DOCUMENTS

| EP | 2329933 A1 | 6/2011 |
| FR | 2303656 A1 | 10/1976 |
(Continued)

OTHER PUBLICATIONS

International search report dated Jun. 2019.

*Primary Examiner* — Robert B Davis

(57) ABSTRACT

The invention proposes a method for positioning protective screening ramps of a station for heating preforms, on the occasion of a change of format, the heating station comprising: —members for transporting preforms; —at least one pair of parallel longitudinal screening ramps for protecting necks against heat, which ramps are parted in order to leave a slot through which the preforms progress; —a motorized device for moving the ramps transversely. The method includes a preliminary calibration step which consists in arranging at least two calibration elements between the two protective screening ramps occupying an initial position, and manually causing the protective screening ramps to move into a calibrated position in which they are each in simultaneous contact with the two calibration elements.

20 Claims, 2 Drawing Sheets

(51) Int. Cl.
  *B29C 49/06*   (2006.01)
  *B29C 49/64*   (2006.01)

(56) References Cited

U.S. PATENT DOCUMENTS

2016/0151955 A1* 6/2016 Morin ................. B29C 49/4205
                                                   414/751.1
2016/0332354 A1* 11/2016 Tanner ............... B65G 21/2072
2020/0299066 A1* 9/2020 Salomon ............ B29C 49/4205

FOREIGN PATENT DOCUMENTS

| FR | 2922148 A1 | 4/2009 |
| FR | 2930241 A1 | 10/2009 |
| FR | 2950284 A1 | 3/2011 |
| FR | 3037329 A1 | 12/2016 |

* cited by examiner

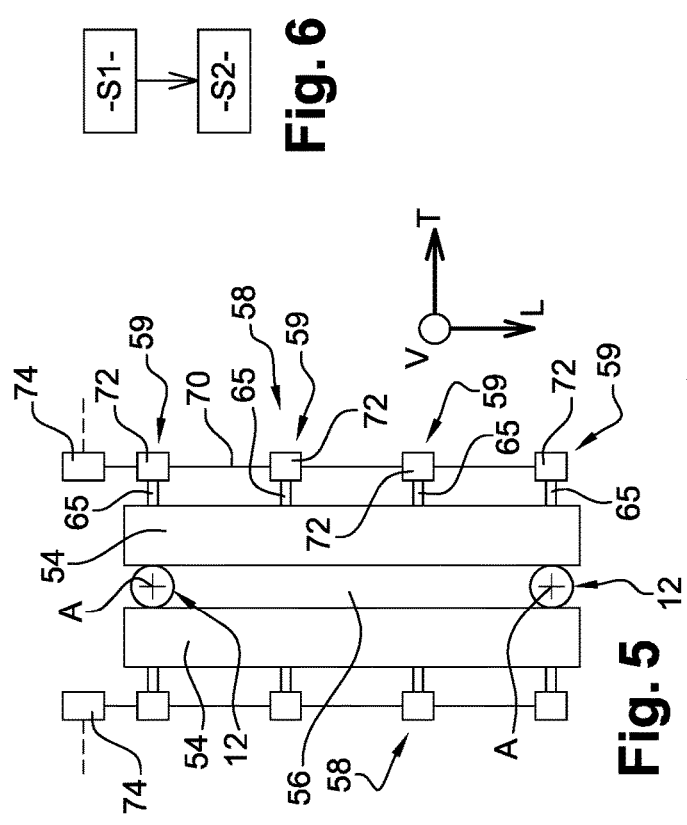
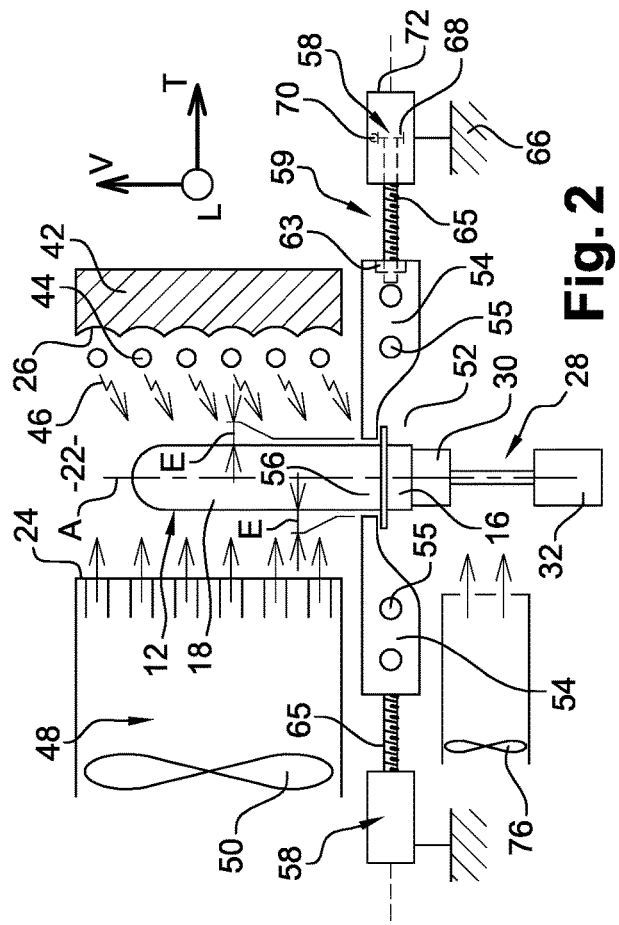
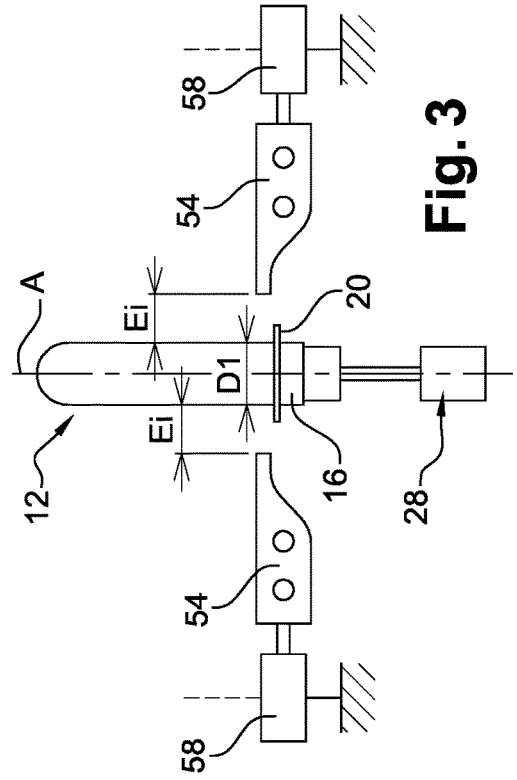

METHOD FOR POSITIONING HEAT-SCREENING RAMPS IN A PREFORM HEATING STATION

TECHNICAL FIELD OF THE INVENTION

The invention relates to a method for positioning protective shields in a station for heating preforms made of thermoplastic material during a change of format of preforms.

TECHNICAL BACKGROUND OF THE INVENTION

Installations for the mass-production of containers from preforms are already known. The preforms are generally obtained by injection-molding a thermoplastic material. Then they are cooled and stored in order to be subsequently converted into final containers.

The preforms conventionally have a body that is intended to be shaped into a final container during an operation for shaping, for example by blow-molding or by stretch-blow-molding, the wall of the preform. The preforms also have a neck, which has already been molded in its final shape. It is therefore important to protect the neck of the preform so that it is not deformed or damaged while the final container is being produced.

In order to allow the body of the preform to be shaped during the shaping step, the wall of the body is heated beforehand to a high enough temperature to make it malleable. This heating operation is carried out just before the shaping operation by passing the preform through a heating station.

The heating station generally has a heating tunnel in which heating devices, such as infrared lamps, are arranged. The preforms are taken up by transport members that guide their bodies through the heating tunnel. To allow uniform heating of the bodies of the preforms, the transport members are generally designed to rotate the preform about its main axis while it is being transported. To avoid any overheating of the body of the preform, it is also known practice to equip the heating tunnel with ventilation means that make it possible to circulate the air, thereby avoiding the creation of zones that are too hot in the heating tunnel.

The body of the preform is rendered malleable by heating the thermoplastic material of which its wall is made, in particular above a glass transition temperature.

As explained above, the neck of the preform already exhibits its final shape. Unlike the body of the preform, the neck is thus kept at a temperature below said glass transition temperature so as to avoid any deformation thereof.

To this end, the heating station is designed such that the body of the preform is received in a "hot" part of the station formed by the heating tunnel, while the neck of the preform, which has to remain relatively cold, is received in a "cold" part, which is generally situated beneath the heating tunnel.

Of course, the hot part and the cold part of the heating station are adjacent to one another. In order to reduce exchanges of heat between the hot part and the cold part, it is known practice to interpose heat shields between these two parts, the preforms running between said heat shields. These protective shields make it possible to reduce the size of the opening between the heating tunnel and the cold part. The protective shields are spaced apart so as to form a running slot that has a width slightly greater than the outside diameter directly under the neck of the preform in order to allow the preforms to run through without being in contact with the protective shields.

These two protective shields are generally cooled by internal circulation of a heat-transfer liquid in order to avoid heat building up in the protective shields.

Furthermore, the installations for producing containers are intended to make it possible to produce final containers of different formats. This generally involves the use of preforms with suitable formats and dimensions.

During a change of container format, it is therefore necessary to adapt the installation, and in particular the heating station, to the dimensions of the new preforms. This involves in particular adjusting the spacing of the protective shields in order to adapt the width of the slot to the under-neck diameter of the preforms of the new format.

Purely manual adjustment of the position of each protective shield takes time.

It has already been proposed to automate the adjustment of the protective shields by inputting into an electronic control unit the theoretical under-neck diameter of the batch of preforms to be processed. The electronic control unit then drives motor-driven means for moving the protective shields in order to obtain a slot width adapted to said theoretical under-neck diameter.

However, such a method is not robust since, in the event of a design fault or labeling fault of the batch of preforms, the spacing of the protective shields may be either too large, making it easier for heat to pass from the tunnel to the cold part, or too small, causing the preforms to jam when they pass between the protective shields.

At all events, this entirely automatic method does not make it possible to produce optimal spacing of the protective shields with respect to the actual value of the under-neck diameter of the preforms.

BRIEF SUMMARY OF THE INVENTION

The invention proposes a method for positioning protective shields in a station for heating preforms made of thermoplastic material, so as to adapt the heating station to a new format of preforms, each preform having a neck intended to be at a moderate temperature and a body having, directly beneath the neck, an outside diameter referred to as the "under-neck diameter", the heating station having:

members for transporting the preforms one after another along a heating tunnel;

at least one pair of parallel longitudinal heat shields for the necks, said heat shields being spaced apart transversely so as to leave a longitudinal slot for the preforms to run through, at least one of the protective shields being movable transversely so as to adapt the width of the slot to the new format of preforms;

a motor-driven device for moving the at least one movable shield so as to automatically adapt the width of the slot, the positioning method being characterized in that it has a prior calibration step, during which:

the two protective shields are moved into an initial position in which they are spaced apart by a first distance much greater than the under-neck diameter of preforms of the new format, at least two calibration elements that have a predetermined transverse width relative to the under-neck diameter of the preforms of the new format are arranged, then the at least one movable protective shield is driven in movement so as to move the protective shields transversely toward one another into a calibrated position in which they are each in simultaneous contact with the two calibration elements.

A "distance much greater" than the under-neck diameter D1 is understood to be a distance greater not just than the under-neck diameter but also greater than the sum of the under-neck diameter and a functional clearance allowing the preforms to run along the longitudinal slot between the two heat shields.

According to one embodiment, the method may comprise one or more of the following features, which may be taken on their own or in combination:

the prior calibration step comprises, for each of the two calibration elements, a measurement of a physical variable correlated with a pinching force of said calibration element between the protective shields, and a measurement of the position of the at least one movable protective shield. Advantageously, the calibrated position is equal to the measured position for the at least one movable protective shield when the physical variable measured for each of the two calibration elements corresponds at the same time to one and the same threshold pinching force.

the motor-driven device for moving the at least one movable protective shield comprises at least two electric motors that are each equipped with a position encoder. The arrangement of the two calibration elements may be effected by arranging each of the calibration elements respectively in the vicinity of one of the two electric motors. Advantageously, the step of driving the at least one protective shield comprises driving one of the electric motors so as to pinch the corresponding calibration element between the two protective shields until an electric driving intensity of said electric motor reaches a predetermined value, and then driving the other electric motor until the other calibration element is pinched with a predetermined value of an electric driving intensity of said other electric motor. In particular, the calibrated position of the at least one movable protective shield may be determined by the two encoding positions of the two electric motors corresponding to the time at which, simultaneously, the electric driving intensity of each electric motor is equal to the corresponding predetermined value.

the two shields of the pair are movable.

the motor-driven device is able to be driven either automatically by an electronic control unit or manually via a control interface.

the protective shields are equipped with means for cooling by heat-transfer fluid.

According to one variant, the predetermined transverse width of the two calibration elements has been predetermined in order that the calibrated position of the at least one movable protective shield corresponds to a functional position of the protective shields.

Advantageously, the calibrated position may be recorded by the electronic control unit in correspondence with the new format of preforms.

Advantageously, the calibration elements may be formed by rigid templates.

According to another variant, following the prior calibration step (S1), a step (S2) of optimally positioning the protective shields is started, during which the movement of the protective shields is controlled automatically by the electronic control unit toward a functional position in which each protective shield is spaced apart transversely by a predetermined spacing with respect to the calibration elements so as to allow the preforms to run between the protective shields and/or the heat shielding of the necks without friction.

Advantageously, the predetermined transverse width of the two calibration elements may be equal to the under-neck diameter D1 of the preforms of the new format.

Advantageously, the functional position may be recorded by the electronic control unit in correspondence with the new format of preforms.

For example, the calibration elements may be formed by preforms of said format. Advantageously, the preforms used during the calibration step S1 are introduced automatically between the protective shields into the initial position by the transport members.

BRIEF DESCRIPTION OF THE FIGURES

Further features and advantages of the invention will become apparent from reading the following detailed description, for the understanding of which reference will be made to the appended drawings, in which:

FIG. 2 is a view in vertical cross section on the section plane 2-2 in FIG. 1, showing a preform arranged between heat shields of the heating station, the shields occupying a functional position;

FIG. 3 is a view similar to the one in FIG. 2, showing the shields occupying an initial position;

FIG. 4 is a view similar to the one in FIG. 2, in which the shields are occupying a calibration position;

FIG. 5 is a top view of a longitudinal portion of the tunnel of the heating station, showing the shields, the drive device therefor, and two calibration elements fitted between the shields, which are occupying their calibration position;

FIG. 6 is a block diagram showing the method for positioning the shields that is realized according to the teachings of the invention.

DETAILED DESCRIPTION OF THE FIGURES

Figure 1:
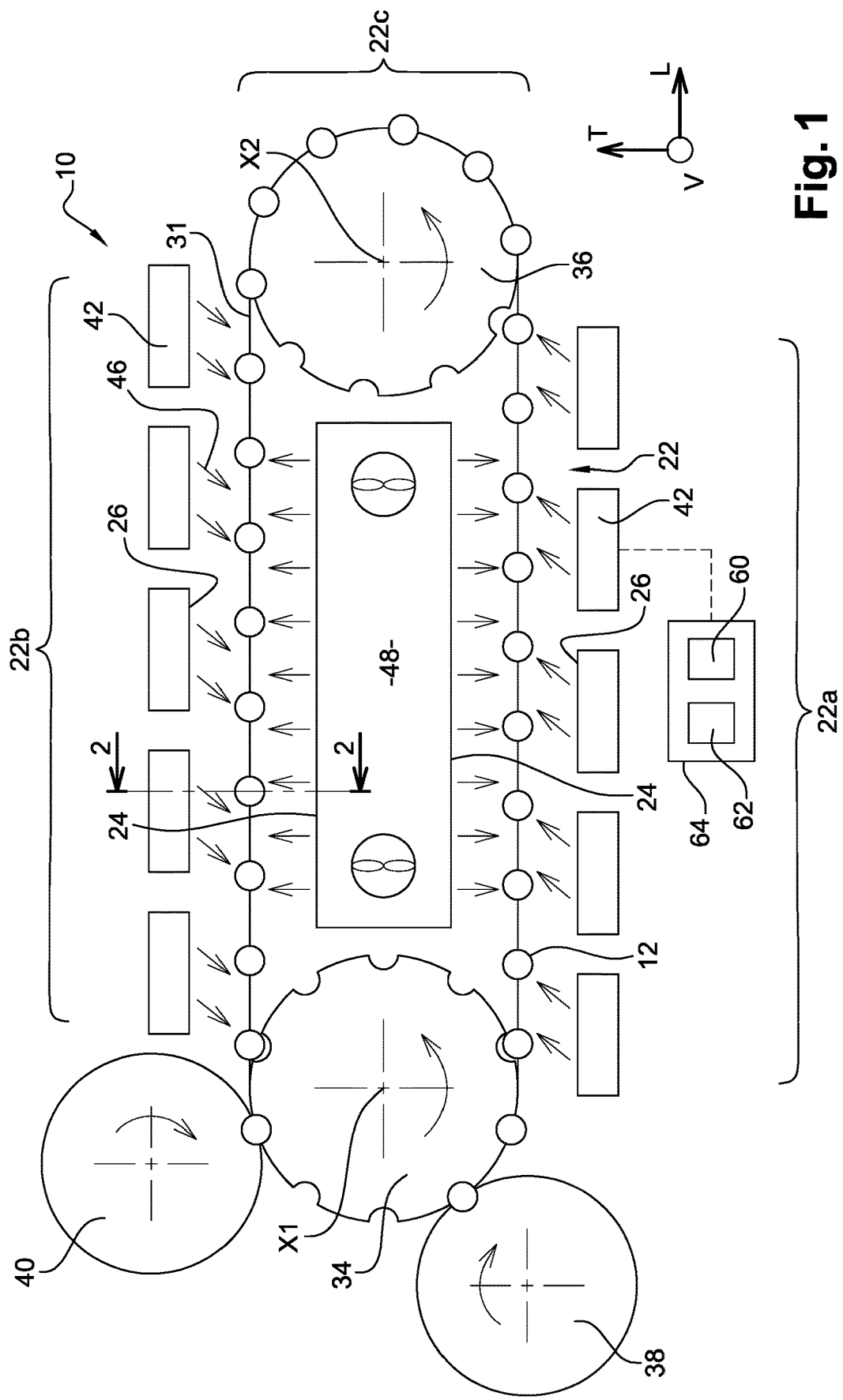
FIG. 1 is a top view schematically showing a heating station that is able to implement the method realized according to the teachings of the invention.

In the rest of the description, elements that have an identical structure or similar functions will be denoted by one and the same reference.

In the rest of the description, a longitudinal orientation, directed from back to front, a transverse orientation, directed from left to right, and a vertical orientation, direction from bottom to top, will be adopted in a nonlimiting manner, these orientations being indicated by the trihedron "L, V, T" in the figures. The vertical direction is used as a purely geometric reference without any association with the Earth's gravity.

FIG. 1 shows a heating station 10 belonging to an installation for producing containers by shaping preforms 12 made of thermoplastic material, such as polyethylene terephthalate (PET), by blow-molding or stretch-blow-molding.

As shown in FIGS. 2 to 4, a preform 12 is in the form of a hollow axisymmetric body with a vertical main axis "A". The preform 12 is closed at a first axial end by a bottom 14 and is open at an opposite axial end forming a neck 16. The preform 12 is thus divided axially into a first portion, which extends from the bottom 14 to the start of the neck 16, this first portion commonly being referred to as the body 18 of the preform, and into a second portion formed by said neck 16. At its junction with the body 18 of the preform 12, the neck 16 has a flange 20. The outside diameter of the body 18 of the preform measured directly above the neck 16, with reference to FIGS. 2 to 4, will be referred to below as "under-neck diameter D1" (since the preform 12 is presented upside down in the figures here).

In a known manner, the body 18 of the preform 12 is intended to be stretched during an operation of shaping the final container, while the neck 16 of the preform 12 already exhibits the desired shape for the final container. To this end, the body 18 is intended to be heated in the heating station 10 so as to become malleable, while the neck 16 is intended to remain at a moderate temperature in the heating station 10 so as to avoid deforming it.

With reference to FIG. 1, the heating station 10 has a heating tunnel 22, which in this case has two longitudinal portions 22a, 22b connected together by a terminal bend 22c. Each longitudinal portion 22a, 22b of the heating tunnel 22 is delimited transversely by an inner wall 24 and by an outer wall 26.

The heating station 10 also has members 28 for transporting preforms 12 one after another along the heating tunnel 22. The preforms 12 are in this case transported with their axis "A" vertical and their neck 16 directed downwardly in the longitudinal portions 22a, 22b and in the terminal bend 22c in order to protect the neck 16 from the heat.

In a variant that is not shown, the invention is also applicable to preforms that are transported with the neck transported upward.

As shown in FIGS. 2 to 4, a transport member 28 generally comprises a mandrel 30, which is intended to be fitted inside the neck 16 of the preform 12 to be transported.

The running of the preforms 12 is in this case realized by a closed chain 31 of transport members 28. For this purpose, each transport member 28 comprises in each case a link 32 that serves as a support for the mandrel 30. Each link 32 is articulated to the links 32 of the adjacent transport members 28.

The mandrel 30 is generally mounted so as to rotate about a vertical axis on the link 32 so as to allow the transported preforms 12 to be rotated about their main axis "A" while they are being moved along the tunnel 22.

The chain 31 is guided and set in motion by meshing about two guide wheels 34, 36. Each wheel 34, 36 is mounted so as to rotate about an associated central vertical axis "X1, X2". The guide wheels 34, 36 are arranged at the two longitudinal ends of the longitudinal portions 22a, 22b of the heating tunnel 22.

In a variant that is not shown, the invention is also applicable to transport members that are carried by independent shuttles that move along a rail. Each shuttle forms for example with the rail a linear electric motor.

The first wheel 34 makes it possible to load cold preforms delivered by an input wheel 38 situated upstream of the first longitudinal portion 22a, and it also makes it possible to unload the hot preforms onto an output wheel 40 situated downstream of the second longitudinal portion 22b.

The second wheel 36 makes it possible to create the bend 22c in the heating tunnel 22.

At least one of the two guide wheels 34, 36 is set in rotation by a motor (not shown) so as to make it possible to guide the chain in rotation in a counter-clockwise direction with reference to FIG. 1. The preforms 12 thus run, upside down with the neck 16 at the bottom, successively longitudinally forward through the first tunnel portion 22a, then through the bend 22c and finally longitudinally toward the rear through the second tunnel portion 22b.

The outer wall 26 of the heating tunnel 22 is formed in this case by the internal face of a plurality of heating modules 42. Each heating module 42 has heating means that emit heating radiation 46 generally transversely toward the interior of the heating tunnel 22, as illustrated in FIG. 2. In a nonlimiting manner, these are infrared lamps 44 here.

The inner wall 24 of the heating tunnel 22 is formed in this case by a face of a cooling block 48. The cooling block 48 is in this case arranged transversely between the two longitudinal portions 22a, 22b of the tunnel. As is shown schematically in FIG. 2, the cooling block 48 has aeration means such as a fan 50, which produces a current of air that is directed transversely toward the interior of the tunnel 22 through a grating formed in the inner wall 24.

The tunnel 22 is intended to receive the bodies 18 of the preforms 12 that are upside down with their neck 16 at the bottom, their axis "A" being vertical, so as to allow them to be heated to the temperature for the subsequent operation of shaping the final containers.

The tunnel 22 opens vertically downwardly onto a passage 52 for the necks 16 of the preforms 12 to run in. As explained above, the necks 16 of the preforms 12 have to be at a moderate temperature, that is to say kept at a temperature below the glass transition temperature of the material of which they are made.

In order to limit the passage of heating radiation from the tunnel 22 to the passage 52 or the passage of hot air by convection, at least one pair of parallel longitudinal heat shields 54 for the necks 16 of the preforms 12 is interposed vertically between the tunnel 22 receiving the bodies of the preforms and the passage 52 receiving the necks 16 of the preforms. Each longitudinal portion 22a, 22b is in this case equipped with a pair of protective shields 54.

The upper face of each protective shield 54, turned toward the tunnel 22, advantageously forms a reflective surface for reflecting the heating radiation in the direction of the body 18 of the preform 12.

In order to avoid heat building up in the protective shields 54, each protective shield 54 is advantageously equipped with cooling means 55 such as a cooling circuit in which a heat-transfer fluid circulates.

The protective shields 54 of a pair are arranged in one and the same longitudinal transverse plane, on either side of the path along which the preforms 12 run. To this end, the protective shields 54 are spaced apart transversely so as to create a longitudinal slot 56 for the preforms 12 to run in.

With the preforms 12 running along the tunnel 22 with their neck 16 at the bottom, the protective shields 54 of a pair are arranged directly above the flange 20 of the preforms 12, at the under-neck diameter "D1". The slot 56 has a transverse width equal to the sum of the under-neck diameter "D1" of the preform 12 and twice a minimum transverse spacing "E" formed on either side of the preform 12 so as to allow it to run between the protective shields 54 without being in contact therewith. The width of the slot 56 is in particular less than the outside diameter of the flange 20 of the preforms 12.

In order to allow the width of the slot 56 to be adapted to a plurality of formats of preforms 12, at least one protective shield 54 of a pair is mounted so as to be movable transversely with respect to the heating tunnel 22. In the example shown in the figures, both protective shields 54 of the pair are mounted so as to be movable transversely with respect to the heating tunnel 22.

Moreover, the movement of the protective shields 54 is controlled by a motor-driven device 58 in order to automatically adapt the width of the slot 56.

The motor-driven device 58 is able to be driven either automatically by an electronic control unit 60 or manually via a control interface 62. The control interface 62 is arranged for example on a control console 64 of the installation, which also makes it possible to control other operating parameters.

In a variant of the invention that is not shown, the heating module 44 is also mounted so as be movable transversely and/or vertically with respect to the path of the preforms and of the protective shields 54 by virtue of a movement mechanism.

Once the protective shields are positioned in a calibrated position, the movement of the heating module 44 with respect to a calibrated position of the protective shields is driven by virtue of a movement mechanism.

The positioning of the heating module 44 with respect to a calibrated position of the protective shields makes it possible to ensure that the heating module 44 is not damaged while it is being positioned, in particular the lamps, and allows optimum positioning of the heating module with respect to the preform to be heated.

The movement mechanism is able to be driven either automatically by an electronic control unit 60 or manually via a control interface 62.

When automatic, the electric control unit 60 drives the movement mechanism by a setpoint.

The setpoint can be a pre-recorded dimension for a calibrated position of the protective shields.

In another variant that is not shown, the heating module is for example secured to at least one of the protective shields.

The motor-driven device 58 of a protective shield 54 has in this case a plurality of movement mechanisms 59 that are mounted along the protective shield 54. Each movement mechanism 59 has a nut 63 that is mounted in a fixed manner on the protective shield 54 and a screw 65, as is illustrated in FIG. 2. The screw 65 can be guided in rotation by a bearing (not shown) secured to a frame 66 of the heating station 10.

The screw 65 is connected to means for driving it in rotation. These means for driving in rotation comprise in this case a toothed wheel 68 that rotates as one with the screw 65. The toothed wheel 68 is associated with a threaded shaft 70. This threaded shaft 70 extends longitudinally along the entire length of the associated protective shield 54, meshing with the toothed wheel 68 of each mechanism 59 associated with said protective shield 54.

The toothed wheel 68 is in this case housed in a protective housing.

The rotation of the threaded shaft 70 is controlled by an electric motor 74 arranged at the shaft end, as is illustrated in FIG. 5. Depending on the direction of rotation of the electric motor 74, this will cause the movement of the protective shield 54 in transverse translation in one direction or the other so as to move the protective shields 54 apart or toward one another.

The motors 74 of the motor-driven devices 58 are able to be driven automatically by the electronic control unit 60. They are also able to be driven manually by a human operator via the control interface 62.

The motors 74 controlling the movements of the protective shields 54 of one and the same pair are able to be driven simultaneously so as to move the two protective shields 54 toward or away from one another by one and the same distance.

In a variant, the motors 74 controlling the movements of the protective shields 54 of one and the same pair are able to be driven independently such that an operator can adjust the position of a first protective shield 54 of the pair and then the other protective shield 54 of the pair from the control interface 62.

The electric motors 74 used are for example equipped with encoders that make it possible to store the position that they occupy in the electronic control unit 60.

Furthermore, in order to avoid heat passing through the slot 56 heating the air contained in the passage 52, a second ventilation means 76 can be arranged to transversely blow a current of air through the passage 52 in order to expel the hot air therefrom, as is shown in FIG. 2.

During a change of format of preforms 12, it is necessary to precisely position the protective shields in order to ensure that the slot 56 is sufficiently wide to allow the preforms 12 to run properly, but sufficiently narrow to minimize the transmission of heat, by radiation or convection, between the tunnel 22 and the passage 52.

The invention proposes a method for positioning the protective shields 54 during a change of format of preforms, which includes a prior calibration step "S1".

As is shown in FIG. 3, at the start of the calibration step "S1", the protective shields 54 of a pair occupy an initial position in which they are spaced apart by a first distance much greater than the under-neck diameter "D1" of the preforms 12 of the new format. Thus, the slot 56 has a transverse width that is equal to the under-neck diameter "D1" plus twice an initial space "Ei" on either side of the preform 12. This initial space "Ei" is much greater than the minimum spacing "E" defined above.

At least two calibration elements having a transverse width with the same dimensions as the under-neck diameter "D1" of the preforms of the new format are arranged between the protective shields 54 of the pair. As is shown in particular in FIG. 5, the calibration elements are arranged generally in the vicinity of each longitudinal end of the slot 56. This makes it possible to ensure that the protective shields 54 of the pair are parallel during the positioning method.

The calibration elements are formed by preforms 12 of said new format. The preforms 12 serving as calibration element are in this case introduced automatically between the shields by the transport members 28. Of course, while the positioning method is being carried out, the preforms 12 serving as calibration element are immobilized between the shields 54.

In a variant, the preforms 12 serving as calibration elements are positioned manually between the shields 54, for example by fitting them manually on mandrels 30 of the transport elements that have been previously immobilized.

According to another variant of the invention that is not shown, the calibration elements are formed by templates.

After the calibration elements, in this case the preforms 12, have been positioned, the protective shields 54 are driven manually in movement via the interface 62 in order to move them toward one another from their initial position, shown in FIG. 3, as far as a calibrated position in which they are each in simultaneous contact with two calibration elements, in this case the preforms 12, as is illustrated in FIG. 4. In the calibrated position of the protective shields 54, the slot 56 thus has a transverse width that is equal to the under-neck diameter "D1" of the preforms 12 of the new format. In the calibration position, the preforms 12 are not clamped between the protective shields 54.

The manual adjustment of the position of the protective shields 54 makes it possible in particular to avoid damage to the shields 54 as a result of the preforms 12 being clamped too tightly, as could occur in the case of entirely automatic adjustment.

Following the prior calibration step "S1", a step "S2" of optimally positioning the shields 54 of the pair is started, during which the shields 54 of the pair are controlled automatically in movement by the electronic control unit 60 from their calibration position to a functional position in which each shield is spaced apart transversely by the predetermined spacing "E" with respect to the calibration elements, in this case the preforms 12. The functional position is illustrated in FIG. 2. This makes it possible to ensure that the slot 56 is sufficiently wide to allow the preforms to run between the protective shields 54 without friction, while minimizing the passage of heat toward the passage 52.

Advantageously, when the motors 74 are equipped with encoders, the functional position and/or the calibration position of the protective shields 54 is recorded in correspondence with the new format of the preforms 12. Thus, during a subsequent change of preform format for an identical format, it will be possible to directly position the protective shields 54 in their functional position or in their calibration position without it being necessary to repeat the calibration method.

The method carried out according to the teachings of the invention advantageously makes it possible to effect the semi-automatic positioning of the protective shields 54 during a change in formats of preforms 12 in order to obtain a slot 56 of optimal width.

The invention claimed is:

1. A method for positioning protective shields (54) in a station (10) for heating preforms (12) made of thermoplastic material, so as to adapt the heating station to a new format of preforms (12), each preform (12) having a neck (16) intended to be at a moderate temperature and a body (18) having, directly beneath the neck (16), an under-neck diameter (D1), the heating station (10) having:
   members (28) for transporting the preforms (12) one after another along a heating tunnel (22);
   at least one pair of parallel longitudinal heat shields (54) for the necks (16), said heat shields being spaced apart transversely so as to leave a longitudinal slot (56) for the preforms (12) to run through, at least one of the protective shields (54) being movable transversely so as to adapt the width of the slot (56) to the new format of preforms (12);
   a motor-driven device (58) for moving the at least one movable shield (54) so as to automatically adapt the width of the slot (56),
   the positioning method comprising:
   moving, during a prior calibration step (S1), the two protective shields (54) into an initial position in which they are spaced apart by a first distance much greater than the under-neck diameter (D1) of preforms (12) of the new format,
   arranging, into the new format, at least two calibration elements (12) that have a predetermined transverse width relative to the under-neck diameter (D1) of the preforms (12), and
   moving, at least one of the movable protective shields (54) transversely toward the other movable protective shield (54) into a calibrated position in which they are each in simultaneous contact with the two calibration elements (12).

2. The method as claimed in claim 1, wherein the prior calibration step comprises, for each of the two calibration elements, a measurement of a physical variable correlated with a pinching force of said calibration element between the protective shields (54), and a measurement of the position of the at least one movable protective shield (54),
   and in that the calibrated position is equal to the measured position for the at least one movable protective shield (54) when the physical variable measured for each of the two calibration elements corresponds at the same time to one and the same threshold pinching force.

3. The method as claimed in claim 1, wherein the motor-driven device (58) for moving the at least one movable shield (54) comprises at least two electric motors that are each equipped with a position encoder,
   the method further comprising the arrangement of the two calibration elements is effected by arranging each of the calibration elements respectively in the vicinity of one of the two electric motors,
   wherein the step of moving the at least one protective shield (54) comprises driving one of the electric motors so as to pinch the corresponding calibration element between the two protective shields (54) until an electric driving intensity of said electric motor reaches a predetermined value, and then driving the other electric motor until the other calibration element is pinched with a predetermined value of an electric driving intensity of said other electric motor, and
   wherein the calibrated position of the at least one movable protective shield (54) is determined by the two encoding positions of the two electric motors corresponding to the time at which, simultaneously, the electric driving intensity of each electric motor is equal to the corresponding predetermined value.

4. The method as claimed in claim 1, wherein the two shields (54) of the pair are movable.

5. The method as claimed in claim 1, wherein the motor-driven device (58) is able to be driven either automatically by an electronic control unit (60) or manually via a control interface (62).

6. The method as claimed in claim 5, wherein the predetermined transverse width of the two calibration elements (12) has been predetermined in order that the calibrated position of the at least one movable protective shield (54) corresponds to a functional position of the protective shields (54), and in that the calibrated position is recorded by the electronic control unit (60) in correspondence with the new format of preforms (12).

7. The method as claimed in claim 6, wherein the calibration elements are formed by rigid templates.

8. The method as claimed in claim 5, wherein, following the prior calibration step (S1), a step (S2) of optimally positioning the protective shields (54) is started, during which the movement of the protective shields (54) is controlled automatically by the electronic control unit (60) toward a functional position in which each protective shield (54) is spaced apart transversely by a predetermined spacing (E) with respect to the calibration elements (12) so as to allow the preforms (12) to run between the protective shields (54) and/or the heat shielding of the necks without friction.

9. The method as claimed in claim 8, wherein the predetermined transverse width of the two calibration elements (12) is equal to the under-neck diameter (D1) of the preforms (12) of the new format.

10. The method as claimed in claim 9, wherein the functional position is recorded by the electronic control unit (60) in correspondence with the new format of preforms (12).

11. The method as claimed in claim 8, wherein the calibration elements are formed by preforms (12) of said format.

12. The method as claimed in claim 11, wherein the preforms (12) used during the calibration step (S1) are introduced automatically between the protective shields (54) into the initial position by the transport members (28).

13. The method as claimed in claim 1, wherein the protective shields (54) are equipped with means (55) for cooling by heat-transfer fluid.

14. The method as claimed in claim 2, wherein the motor-driven device (58) for moving the at least one movable shield (54) comprises at least two electric motors that are each equipped with a position encoder, the method further comprising the arrangement of the two calibration elements is effected by arranging each of the calibration elements respectively in the vicinity of one of the two electric motors, wherein the step of moving the at least one protective shield (54) comprises driving one of the electric motors so as to pinch the corresponding calibration element between the two protective shields (54) until an electric driving intensity of said electric motor reaches a predetermined value, and then driving the other electric motor until the other calibration element is pinched with a predetermined value of an electric driving intensity of said other electric motor, and wherein the calibrated position of the at least one movable protective shield (54) is determined by the two encoding positions of the two electric motors corresponding to the time at which, simultaneously, the electric driving intensity of each electric motor is equal to the corresponding predetermined value.

15. The method as claimed in claim 2, wherein the two shields (54) of the pair are movable.

16. The method as claimed in claim 3, wherein the two shields (54) of the pair are movable.

17. The method as claimed in claim 2, wherein the motor-driven device (58) is able to be driven either automatically by an electronic control unit (60) or manually via a control interface (62).

18. The method as claimed in claim 3, wherein the motor-driven device (58) is able to be driven either automatically by an electronic control unit (60) or manually via a control interface (62).

19. The method as claimed in claim 9, wherein the calibration elements are formed by preforms (12) of said format.

20. The method as claimed in claim 10, wherein the calibration elements are formed by preforms (12) of said format.

* * * * *